(No Model.)

J. W. BROWN.
RUBBER SOLE FOR BOOTS OR SHOES.

No. 583,641. Patented June 1, 1897.

WITNESSES
Edwin L. Bradford
L. G. Marshall

INVENTOR
John W. Brown
BY
Johnson and Johnson
ATTORNEYS

UNITED STATES PATENT OFFICE.

JOHN W. BROWN, OF TRENTON, NEW JERSEY, ASSIGNOR TO HIMSELF, AND WILLIAM G. GRIEB AND HARRY GRIEB, OF PHILADELPHIA, PENNSYLVANIA.

RUBBER SOLE FOR BOOTS OR SHOES.

SPECIFICATION forming part of Letters Patent No. 583,641, dated June 1, 1897.

Application filed December 24, 1896. Serial No. 616,852. (No model.)

*To all whom it may concern:*

Be it known that I, JOHN W. BROWN, a subject of the Queen of Great Britain, residing at the city of Trenton, (Millham,) in the county of Mercer and State of New Jersey, have invented a certain new and useful Improvement in Rubber Soles for Boots or Shoes, of which the following is a specification.

My improvement provides a construction of rubber shoe-sole which renders it more durable and flexible under the tread of the wearer, and particularly in a construction in which the sole is formed with corrugations between a raised surface part around the edge of the sole, along which line the inner wall of the raised part is beveled inward and upon which the corrugations terminate in V-shaped ends, whereby disintegration along the ends of the corrugations is prevented in the bending of the sole, while surrounding the ends of the corrugations with a wear-surface. In these particulars the construction is illustrated in the accompanying drawings of a rubber shoe-sole, and in which—

Figure 1:
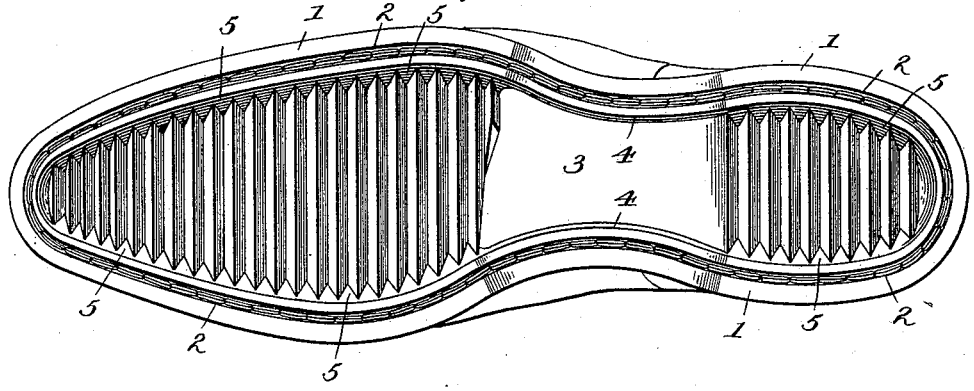
Figure 2:
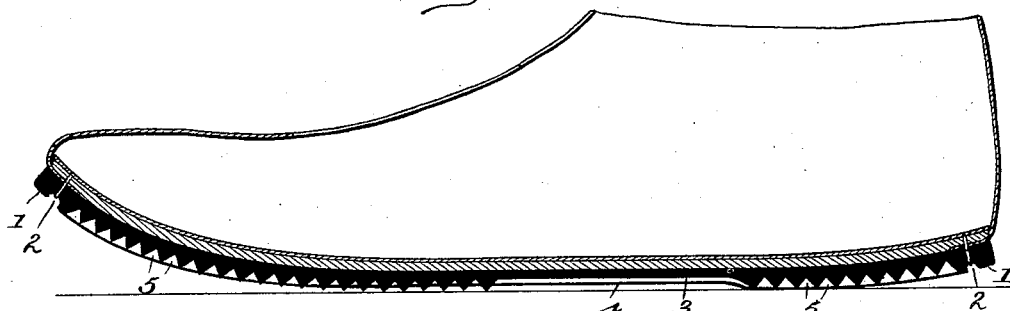
Figure 3:
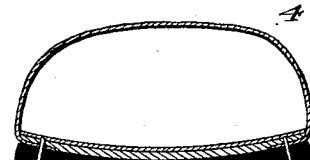
Figure 4:
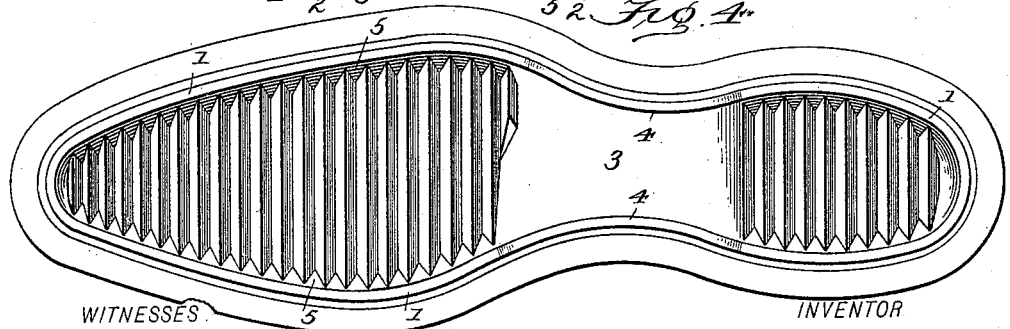
Figure 5:
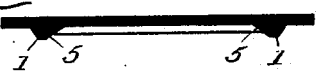

Figure 1 shows the rubber sole and the transverse corrugations thereof as terminating in the beveled walls of a raised surface around the edge of the sole. Fig. 2 is a longitudinal section of the rubber sole as applied to the outer sole, and Fig. 3 is a transverse section of the same. Figs. 4 and 5 show the sole without stitching-channel.

The sole is produced in a mold, the rubber being molded upon a fabric backing. Along and round the edge on the wearing side the sole has a molded raised surface part 1, in which is preferably formed a continuous channel or groove 2 to receive the stitching, and this raised part is about half an inch wide from the edge, so that the edge of the sole is thereby made the thickest. Between the raised channeled part the surface is about half the thickness of the raised edge part, and this part of least thickness is transversely corrugated from the toe back to that part which corresponds with that part of the foot in which the ball merges into the shank. At the heel that part of the surface between the raised part is also corrugated transversely, leaving a plain surface 3, corresponding to the shank of the foot. At this shank part the raised part 4 has a thickness of about half that which surrounds the corrugations to give the required elasticity.

The corrugations form ridges of inverted-V shape in cross-section, and the walls 5 around the inner sides of the raised part are beveled inward, so that the ridges of the corrugations join these beveled walls in V form. The lines of these ridges are a little below the level of the surface of the raised part, as in Figs. 3 and 5. The beveled walls between the ends of the corrugations are of reverse-V form, and this joining of the beveled walls at the ends of the ridges is the provision which prevents the breaking of the sole along the edge surrounding the corrugations under the bending action of the wearer and renders the sole more durable and more elastic, while at the same time the ends of the ridges are protected from undue wear. It will be understood that the ridges of the corrugations are protected in a measure from wear by the higher level of the surrounding raised surface, and that the beveled wall of the raised part and the termination thereon of the ridges of the corrugations prevent the tendency of the breaking of the sole and consequent disintegration along this line.

The raised surface of the sole while forming the principal wearing part also forms a thick edge around the sole and also serves by its surface channel to protect the loop of the stitching and to render the sewing of the shoe much easier, while the sinking of the corrugated surface below the channeled surface gives a sort of air-cushion effect to the sole.

I claim—

As a new article of manufacture a rubber shoe-sole formed with transverse corrugations within and between a raised surface part around the edge of the sole, the said corrugations being of V form, the inner walls of the raised part joining the bottom grooves of the corrugations by inward beveled V-shaped walls and the corrugations terminating in V-shaped ends upon the said beveled walls whereby to prevent the breaking and disintegration of the sole along the joining of the corrugations with the raised surface part.

JOHN W. BROWN.

In presence of—
ROBERT G. McDOUGAL,
CHARLES W. SPARHAWK.